United States Patent
Manolakos et al.

(10) Patent No.: US 11,212,032 B2
(45) Date of Patent: Dec. 28, 2021

(54) PARTIAL/FULL OVERLAPPING OF MULTIPLE PDSCHS FOR NON-IDEAL BACKHAUL AND ASSOCIATED RATE MATCHING OF DMRS PORTS

(71) Applicant: QUALCOMM Incorporated, San Diego, CA (US)

(72) Inventors: Alexandros Manolakos, San Diego, CA (US); Seyedkianoush Hosseini, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/594,686

(22) Filed: Oct. 7, 2019

(65) Prior Publication Data
US 2020/0112390 A1 Apr. 9, 2020

Related U.S. Application Data

(60) Provisional application No. 62/742,885, filed on Oct. 8, 2018.

(51) Int. Cl.
*H04L 1/00* (2006.01)
*H04W 72/12* (2009.01)

(52) U.S. Cl.
CPC ....... *H04L 1/0013* (2013.01); *H04W 72/1273* (2013.01)

(58) Field of Classification Search
CPC ... H04L 1/0013; H04L 1/0067; H04L 5/0094; H04L 5/0051; H04L 5/0007;
(Continued)

(56) References Cited

U.S. PATENT DOCUMENTS

| 2014/0192734 A1 | 7/2014 | Ng et al. |
| 2014/0233407 A1* | 8/2014 | Pourahmadi .......... H04L 5/0094 370/252 |

(Continued)

OTHER PUBLICATIONS

Huawei, et al., "Enhancement to PDSCH RE Mapping and Resource Allocation for Non-Coherent JT", 3GPP TSG RAN WG1 Meeting #89, 3GPP Draft; R1-1707009, 3rd Generation Partnership Project (3GPP), Mobile Competence Centre; 650, Route Des Lucioles; F-06921 Sophia-Antipolis Cedex; France, vol. RAN WG1, No. Hangzhou, China May 15, 2017-May 19, 2017, May 14, 2017 (May 14, 2017), 5 Pages, XP051272239, Retrieved from the Internet: URL: http://www.3gpp.org/ftp/Meetings_3GPP_SYNC/RAN1/Docs/ [retrieved on May 14, 2017] p. 3.
(Continued)

Primary Examiner — Kwang B Yao
Assistant Examiner — Syed M Bokhari
(74) Attorney, Agent, or Firm — Patterson + Sheridan, L.L.P.

(57) ABSTRACT

Certain aspects of the present disclosure provide techniques for rate matching PDSCH transmissions in multi-TRP scenarios. In some cases, if first and second TRPs have little or no coordination, each TRP may take care to avoid transmitting on DMRS resources of the other TRP. In some cases, each TRP may be assigned a different subset of DMRS ports of a port group.

28 Claims, 13 Drawing Sheets

(58) Field of Classification Search
CPC .............. H04L 5/0016; H04L 5/0035; H04W 72/1273; H04B 7/024
USPC ........................................ 370/330, 329, 252
See application file for complete search history.

(56) References Cited

U.S. PATENT DOCUMENTS

| | | | |
|---|---|---|---|
| 2016/0255519 A1* | 9/2016 | Cheng .................. | H04J 11/0056 370/329 |
| 2019/0165880 A1* | 5/2019 | Hakola ................... | H04L 1/008 |
| 2020/0205142 A1* | 6/2020 | Gao ...................... | H04L 5/0048 |
| 2020/0367242 A1* | 11/2020 | Moon ...................... | H04L 1/00 |

OTHER PUBLICATIONS

International Search Report and Written Opinion—PCT/US2019/055199—ISA/EPO—dated Jan. 17, 2020.

* cited by examiner

PARTIAL/FULL OVERLAPPING OF MULTIPLE PDSCHS FOR NON-IDEAL BACKHAUL AND ASSOCIATED RATE MATCHING OF DMRS PORTS

CROSS-REFERENCE TO RELATED APPLICATIONS

This Patent Application claims priority to U.S. Provisional Patent Application No. 62/742,885 filed Oct. 8, 2018, which is assigned to the assignee hereof, is considered part of, and is incorporated by reference in this Patent Application.

INTRODUCTION

Aspects of the present disclosure relate to wireless communications, and more particularly, to techniques for rate matching around potentially overlapping demodulation reference signal (DMRS) resources in scenarios with multiple transmit receive points (TRPs).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes obtaining information regarding a first configuration indicating resources available to at least a first transmission reception point (TRP) for transmitting demodulation reference signals (DMRS) for a physical downlink shared channel (PDSCH), obtaining information regarding a second configuration indicating resources available to at least a second TRP for transmitting DMRS for a PDSCH, and determining, based on the first configuration, that DMRS or data transmissions from the second TRP potentially overlap with DMRS or data transmissions from the first TRP, and performing rate matching when processing PDSCH transmissions with potential overlap of DMRS transmissions from the first and second TRPs based on the determination.

Certain aspects provide a method for wireless communication by a network entity (e.g., a first TRP). The method generally includes obtaining information regarding a first configuration indicating resources available to at least a second TRP for transmitting demodulation reference signals (DMRS) for a physical downlink shared channel (PDSCH), determining, based on the first configuration, that DMRS or data transmissions from the second TRP potentially overlap with DMRS or data transmissions from the first TRP, and performing rate matching around potential DMRS transmission of the second TRP when transmitting a PDSCH to a user equipment (UE), based on the determination.

Certain aspects of the present disclosure also provide various apparatus, means, and computer readable media capable of (or having instructions stored thereon for) performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
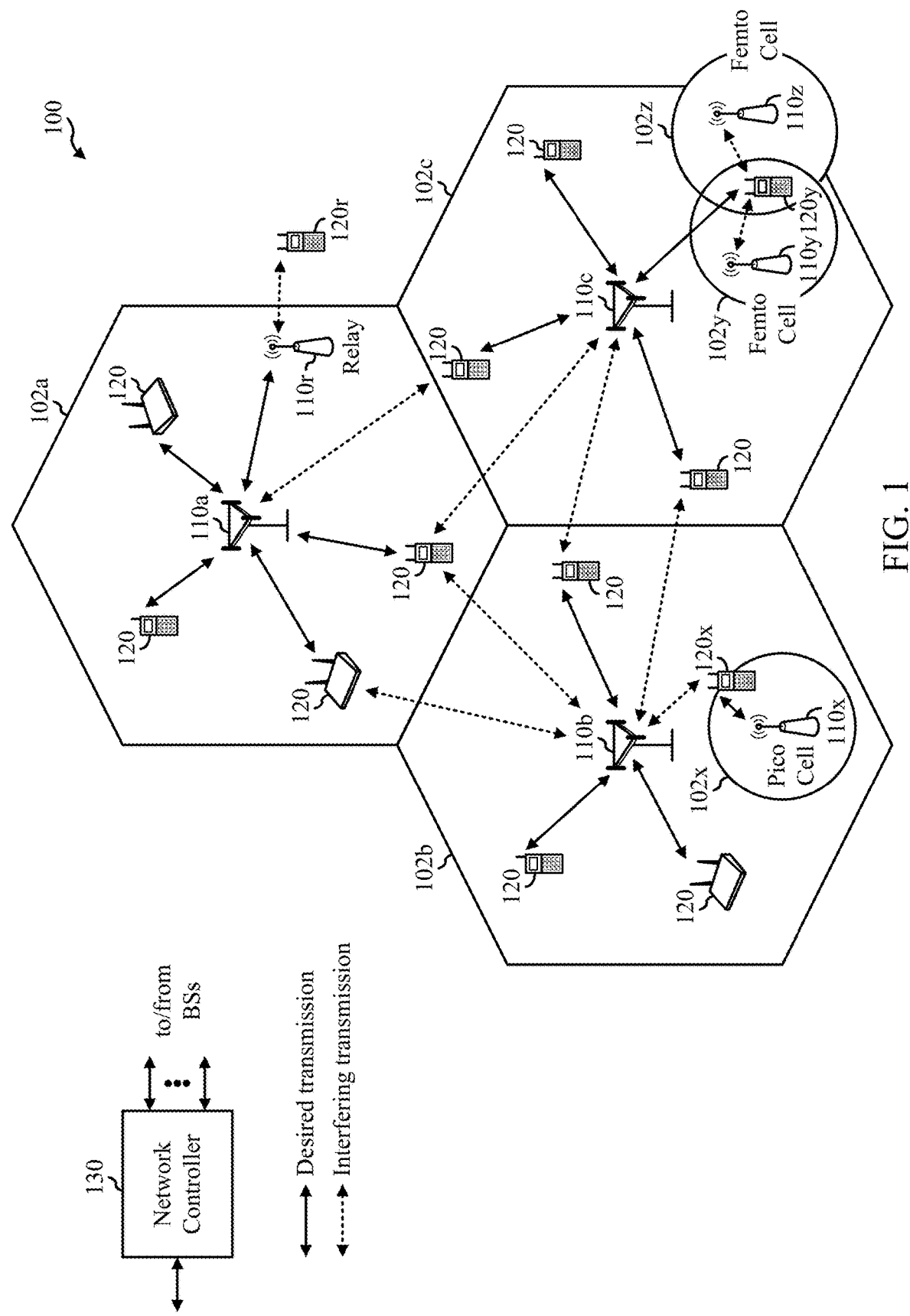
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for rate matching of DMRS transmissions in multiple transmit receive point (multi-TRP) scenarios.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
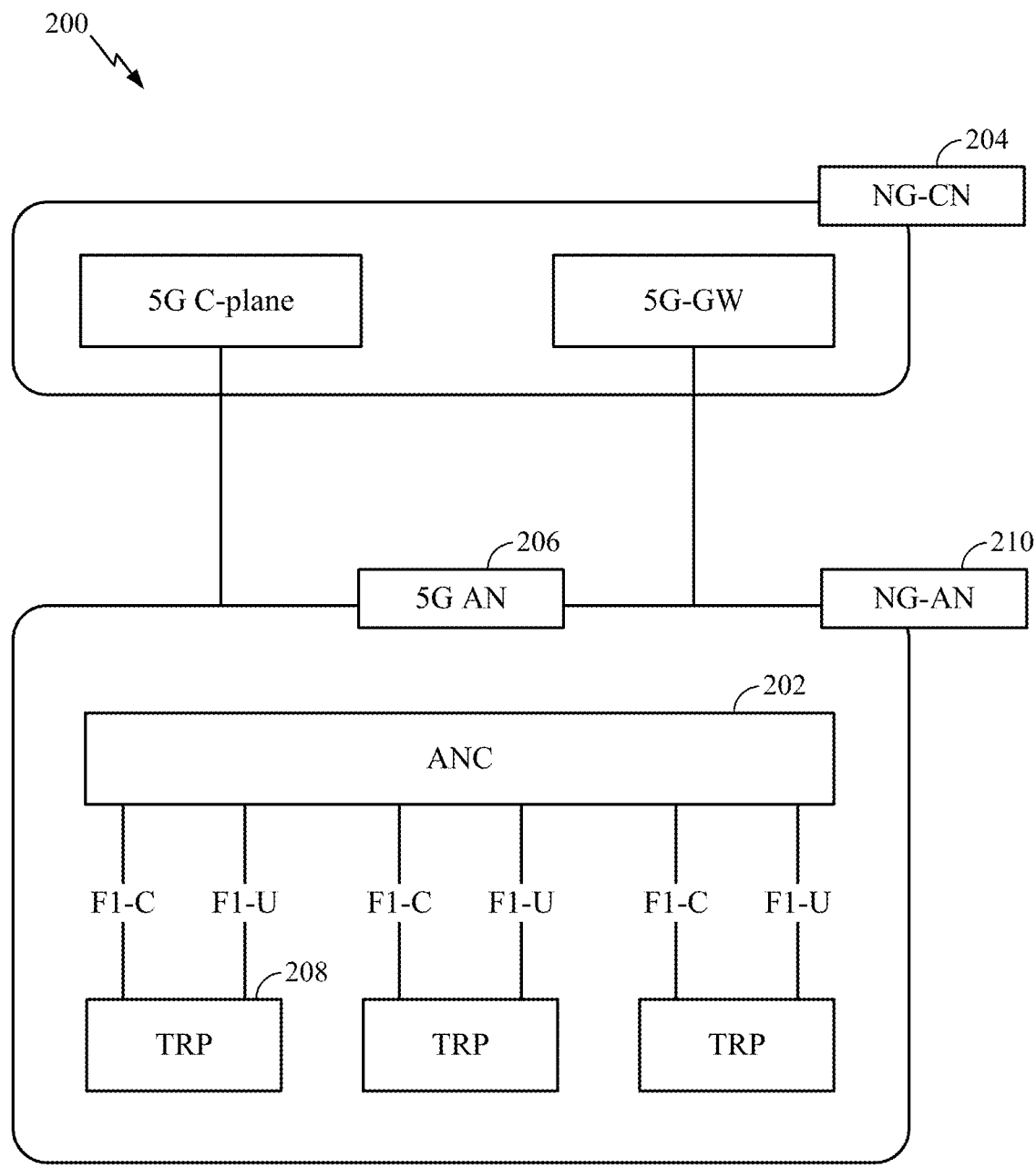
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
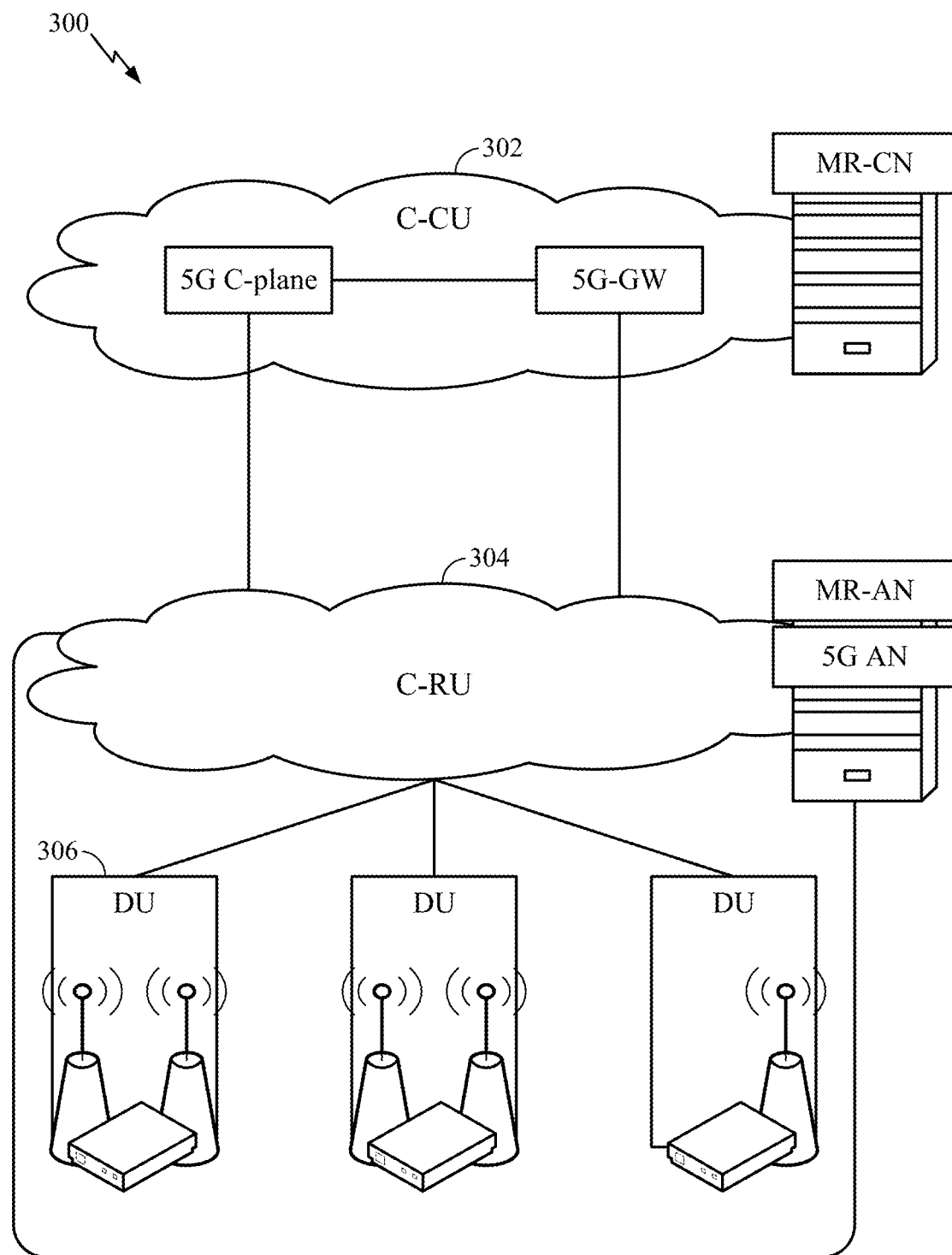
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
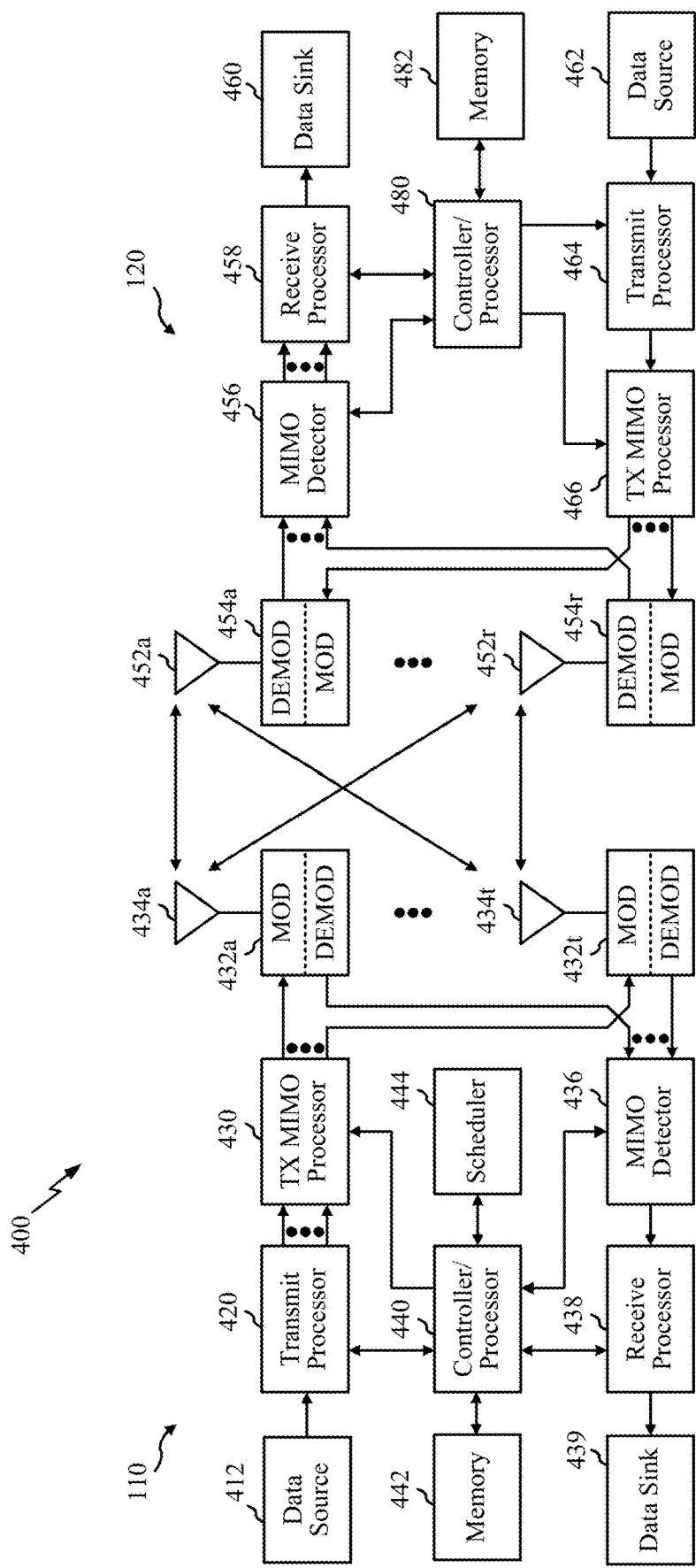
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
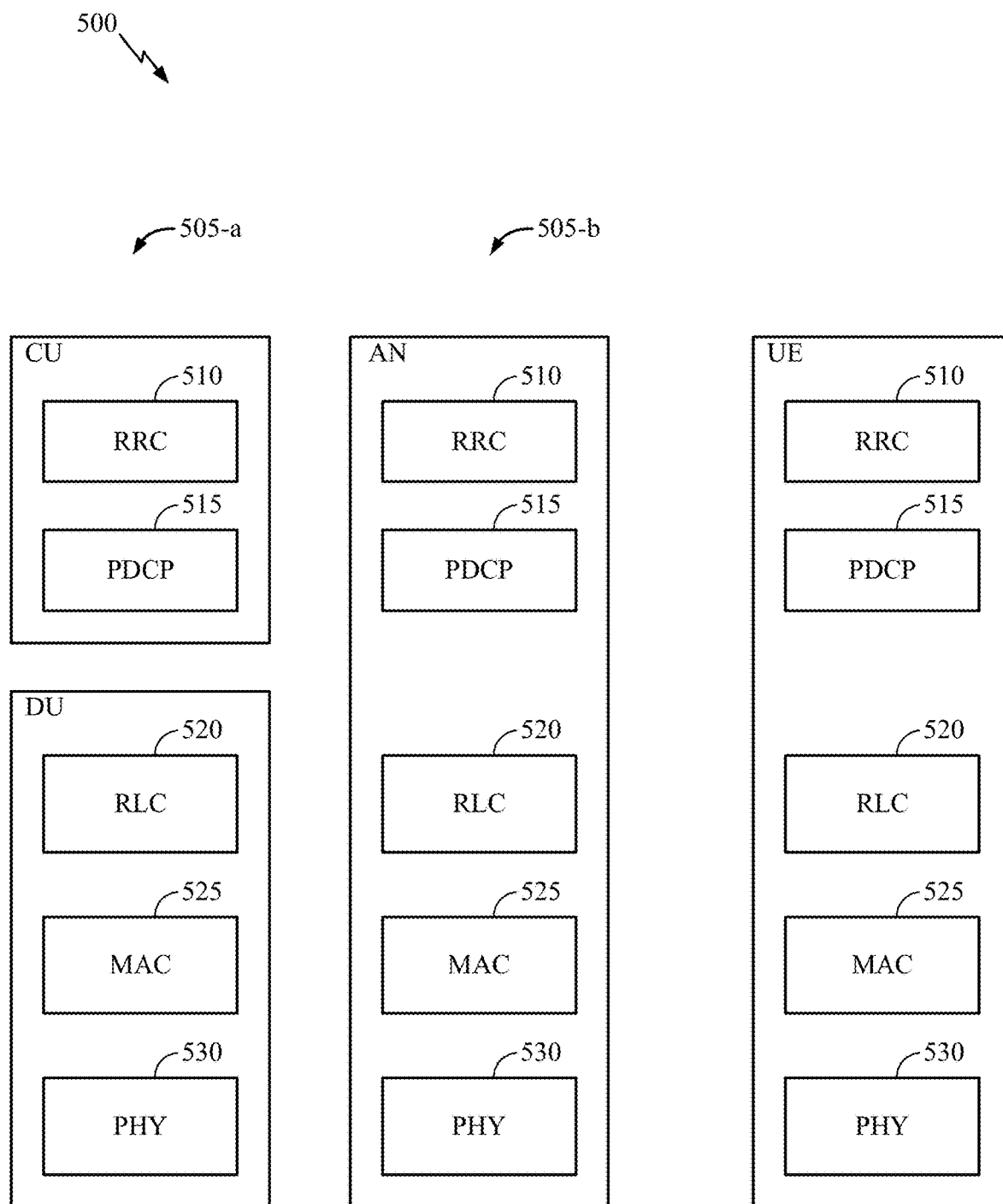
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
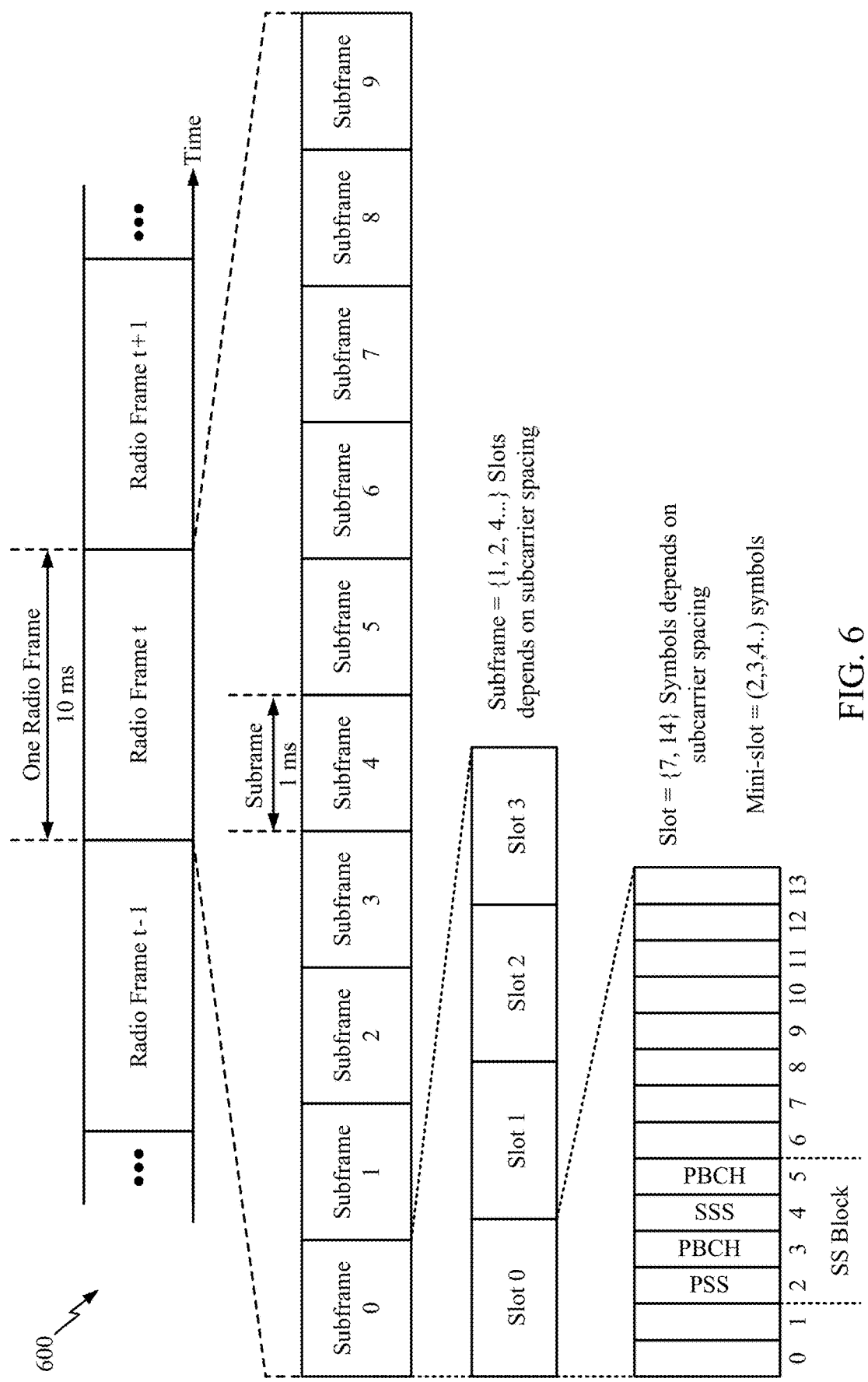
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet-of-Things communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Certain systems perform encoding for some physical channels. For example, some systems perform low density parity check (LDPC) encoding. LDPC involve encoding using a base graph with variable nodes corresponding systematic information bits and parity bits and associated check nodes. The encoding may involve lifting the base graph and interconnecting edges in the base graph using cyclic integer lifting values. The base graph is associated with a code rate, which is sometimes referred to as the mother code rate. For example, a first base graph (referred to as BG1, having N=3K) may have a ⅓ rate and a second base graph (referred to as BG2, having N=5K) may be a ⅕ rate. Rate matching may be performed to achieve different code rates, for example, based on available transmission resources at the transmitting device. Puncturing may be performed to drop one or more information bits. One objective of rate matching is to select the particular bits to be transmitted within a transmission time interval (TTI). Rate matching may involve various operations, such as sub-block interleaving, bit collection, and pruning. In some examples, polar coding or other coding the may be used.

Figure 7:
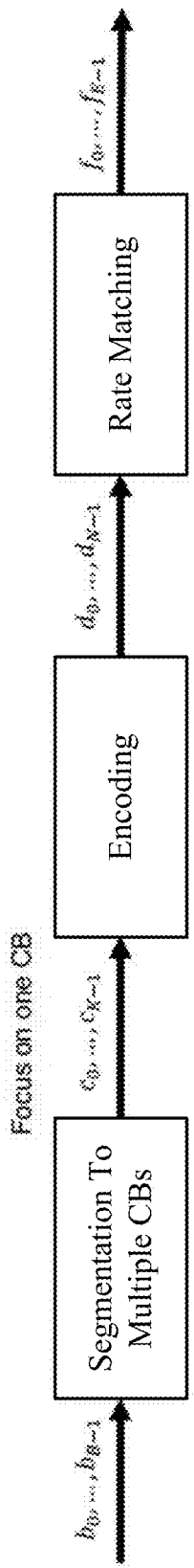
FIG. 7 is a block diagram illustrating an example encoding chain, in accordance with certain aspects of the present disclosure.

FIG. 7 is a block diagram illustrating an example encoding chain, in accordance with certain aspects of the present disclosure. As shown in FIG. 7, a transport block (TB) is segmented into one or more code blocks (CBs), for example, if the TB size is larger than a threshold. The CBs are then encoded. The coded bit sequence for the CB includes information bits and parity bits. After the encoding (and before constellation mapping), rate matching is performed on the coded bits. Each CB may be encoded and rate matched separately.

Example Multi-TRP Transmissions

Advanced systems support multiple input multiple output communications via deployments with enhanced multiple transmit-receiver points (TRPs) and/or TRPs with multiple antenna panels.

In a multi-TRP scenario, multiple TRPs (such as two TRPs) could transmit data to the same UE where the data could belong to the same TB/CB (e.g., same information bits but can be different coded bits) or different TB (e.g., different information bits are sent from multiple TRPs). The UE considers the transmissions from both TRPs and decodes the transmissions accordingly. In some examples, the transmissions from the TRPs is at the same time (e.g., in the same slot, mini-slot, and/or in the same symbols), but across different resource blocks (RBs) and/or different layers. The number of layers and/or the modulation order from each TRP can be the same or different. In some examples, the transmissions from the TRPs can be at different times (e.g., in two consecutive mini-slots or slots). In some examples, the transmissions from the TRPs can be a combination of the above.

Figure 8:
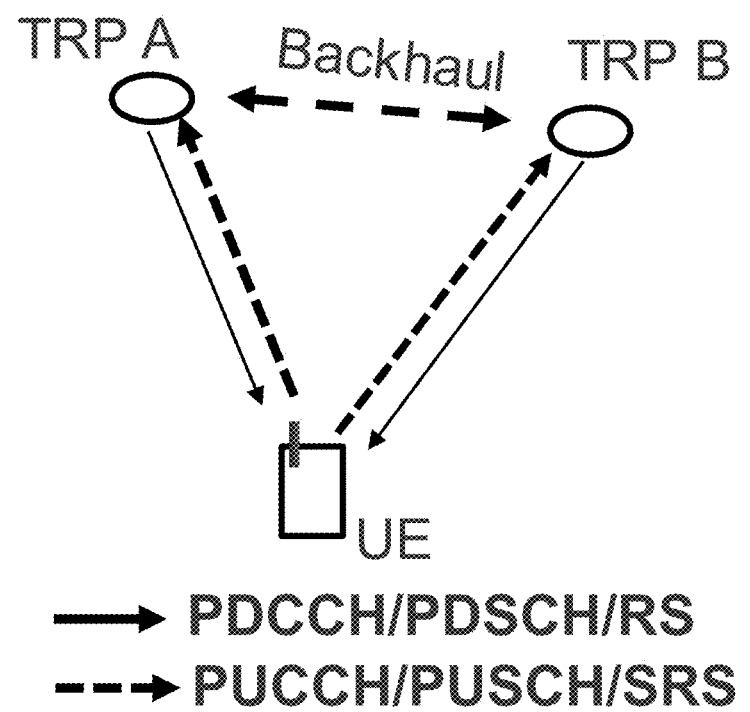
FIG. 8 is a diagram illustrating an example multiple transmission reception point (TRP) transmission scenario, in accordance with certain aspects of the present disclosure.

FIG. 8 is a diagram illustrating an example multi-TRP transmission scenario, in accordance with certain aspects of the present disclosure. In the illustrated example, multiple TRPs (TRP A and TRP B) may communicate with the same UE at the same/different time in a transparent manner either to improve reliability and/or increase throughput. For example, TRP A and TRP B may jointly transmit PDCCH/PDSCH/reference signals (e.g., DMRS) to the same UE. Similarly, on the uplink, the UE may transmit PUCCH/PUSCH/reference signals (e.g., SRS) to the TRPs.

TRP A and TRP B may communicate via a backhaul connection. Ideally, to allow dynamic coordinate between TRPs for the multi-TRP transmission, the backhaul allows communication between TRPs with effectively zero delay and unlimited capacity. Unfortunately, many backhaul connections are not ideal, with limited capacity and substantial delay (e.g., 5 ms delay or even more), which may, prevent dynamic coordination between TRPs. In such cases, coordination between the TRPs may be limited for example, to semi-static coordination.

In multi-TRP scenarios, one downlink control information (DCI) may schedule one or more multiple PDSCH transmissions (from multiple TRPs). The DCI may be transmitted by one or multiple TRPs.

In some cases, multiple DCI may schedule multiple (e.g., 2, 4, or more) PDSCH transmissions. In this case, each DCI may be transmitted by one TRP and schedules the corresponding PDSCH (for that TRP). In this case, it may be assumed that each PDSCH contains one QCL assumption.

Example Partial/Full Overlapping of Multiple Pdsch Transmissions for Non-Ideal Backhaul and Associated Rate Matching Of DMRS Ports Aspects of the present disclosure provide some enhancements for multi-TRP and/or multi-panel transmissions. As will be described in greater detail below, in the case DMRS transmissions of two TRPs potentially collide and those TRPs do not have an ideal backhaul, each TRP may perform rate matching around the DMRS transmission of the other TRP. In other words, since such TRPs are not well coordinated, they cannot ensure that they are signaling DMRS ports to the UE which are orthogonal and do not collide in the time/frequency resource grid. Performing rate matching around DMRS transmissions in the case of potential collision may result in improved reliability and robustness with non-ideal backhaul mechanisms.

Figure 9:
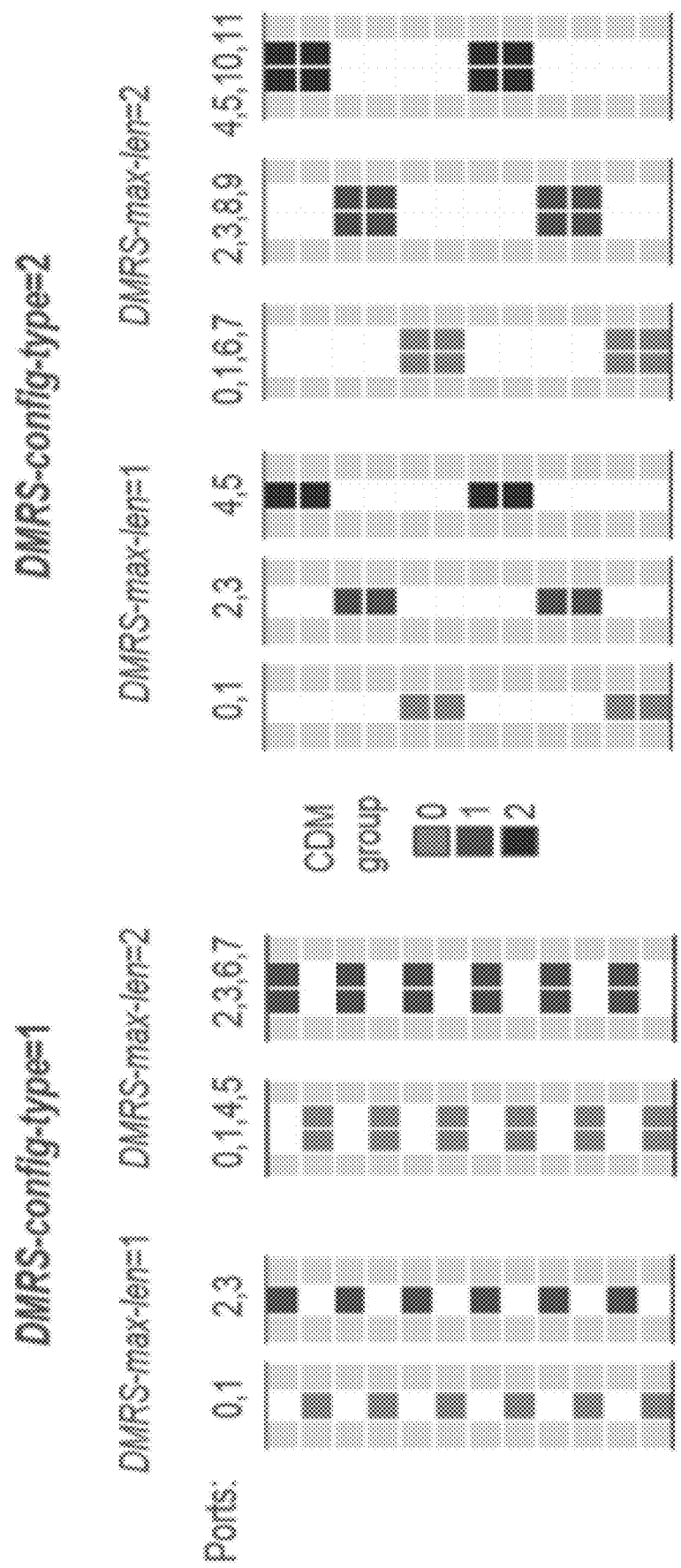
FIG. 9 illustrates examples of demodulation reference signal (DMRS) configurations.

There are various possible DMRS configurations for multi-TRP scenarios. For example, FIG. 9 illustrates examples of demodulation reference signal (DMRS) configurations.

Effectively, each TRP may be assigned a different DMRS port group or configuration. As illustrated, with a first type of DMRS configuration, there are effectively four DMRS ports (ports 0-3) with a one-symbol length or eight DMRS ports assuming a two-symbol length. As illustrated, with a second type of DMRS configuration, there are effectively six DMRS ports (ports 0-5) with a one-symbol length or twelve DMRS ports (ports 0-11) assuming a two-symbol length. As illustrated, code division multiplexing (CDM) may be used in the time domain (where same frequency resources are used).

One challenge in multi-TRP scenarios is how to address rate matching behavior when multiple PDSCH transmissions are partially or fully overlapping, in cases where the TRPs have no or limited coordination (e.g., due to non-ideal backhaul). This may be understood by considering a 2 gNB scenario where the gNBs (acting as TRPs) have relatively little (or no) coordination, but are still well synchronized (OFDM symbol-level synchronization.

Figure 10:
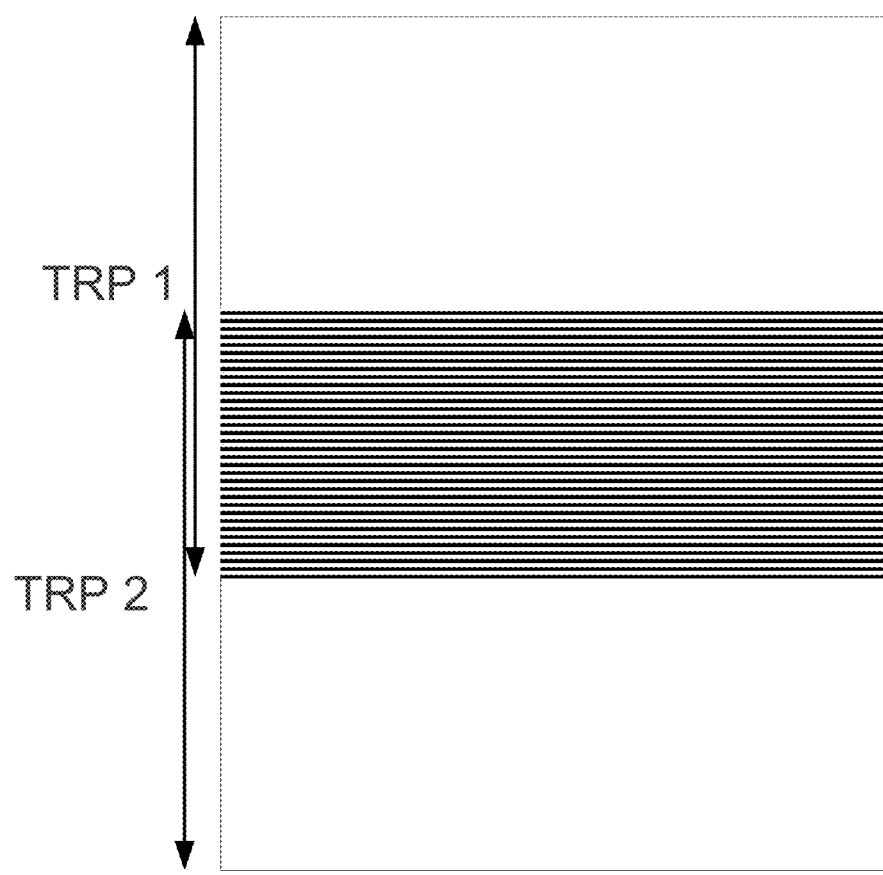
FIG. 10 is a block diagram illustrating an example of transmit receive points (TRPs) with overlapping physical downlink shared channel (PDSCH) resources.

In this case, it may be assumed that both gNBs/TRPs transmit to the UE on the same OFDM symbols with physical PRBs which are partially/fully overlapping PDSCH resources, as illustrated in FIG. 10. It may also be assumed that the gNBs transmit DMRS on the same OFDM symbols.

If the gNBs had good coordination, they might be able to coordinate to ensure that they are signaling DMRS ports to the UE which are orthogonal and do not collide in the time/frequency resource grid.

However, if the gNBs do not have a good coordination (e.g., due to a non-ideal backhaul), the DMRS of the first TRP may collide at least partially with the DMRS of the other TRP.

Aspects of the present disclosure provide mechanisms that may help a UE and multiple TRPs to coordinate rate matching around DMRS for partially or fully overlapping PDSCH transmissions in cases with little or no coordination across TRPs.

Figure 11:
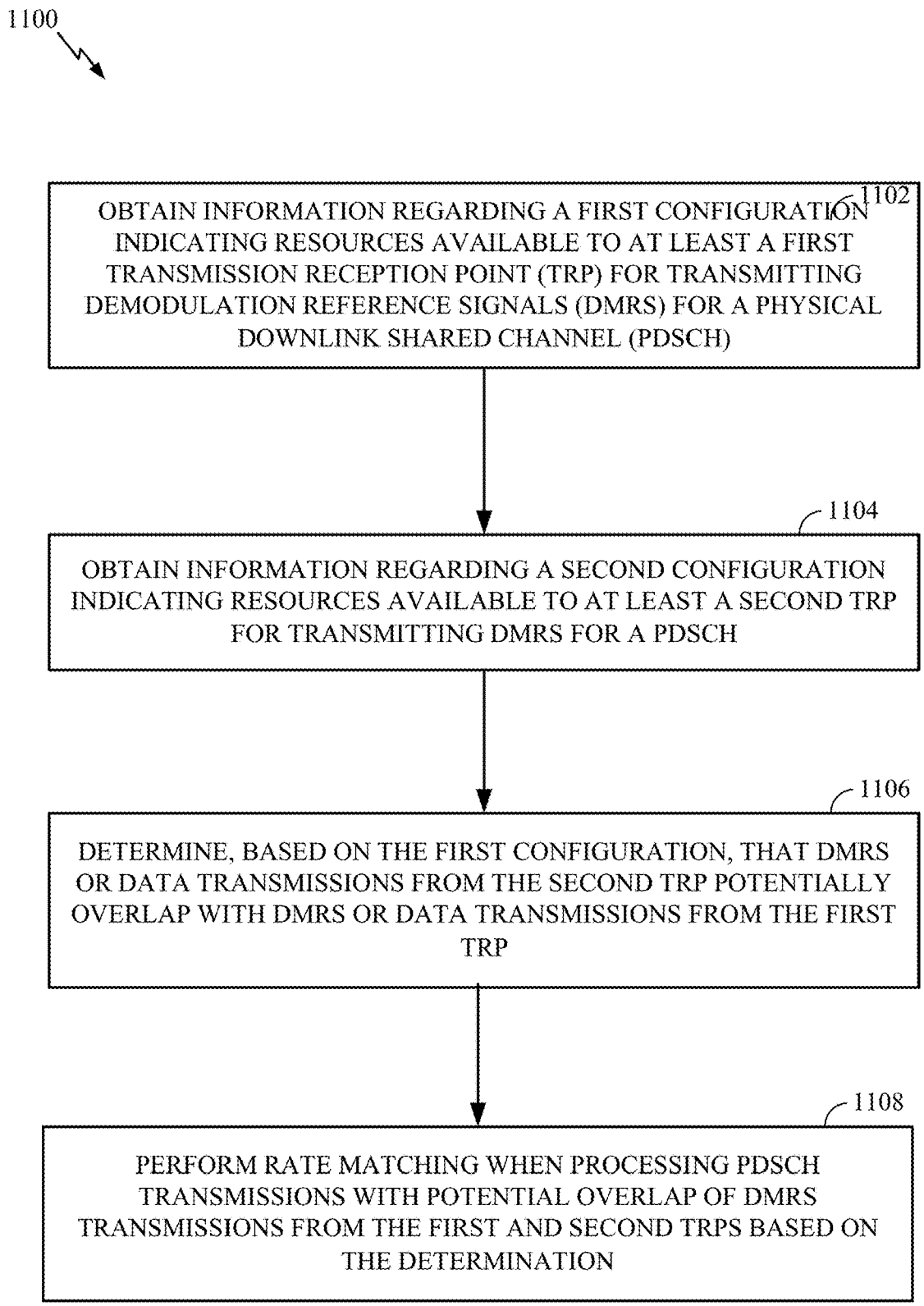
FIG. 11 illustrates example operations that may be performed by a user equipment (UE), in accordance with aspects of the present disclosure.

FIG. 11 illustrates example operations 1100 for wireless communications by a user equipment (UE), in accordance with aspects of the present disclosure. For example, operations 1100 may be performed by a UE 120 shown in FIGS. 1 and 4.

1100 begin, at 1102, by obtaining information regarding a first configuration indicating resources available to at least a first transmission reception point (TRP) for transmitting demodulation reference signals (DMRS) for a physical downlink shared channel (PDSCH). At 1104, the UE obtains information regarding a second configuration indicating resources available to at least a second TRP for transmitting DMRS for a PDSCH. At 1106, the UE determines, based on the first configuration, that DMRS or data transmissions from the second TRP potentially overlap with DMRS or data transmissions from the first TRP.

At 1108, the UE performs rate matching when processing PDSCH transmissions with potential overlap of DMRS transmissions from the first and second TRPs based on the determination. In some cases, the grant the UE receives for the PDSCH transmission from each TRP may account for the rate matching (e.g., the TRPs may schedule the PDSCH transmissions accounting for the potential overlap in DMRS transmissions from the two TRPs.

Figure 12:
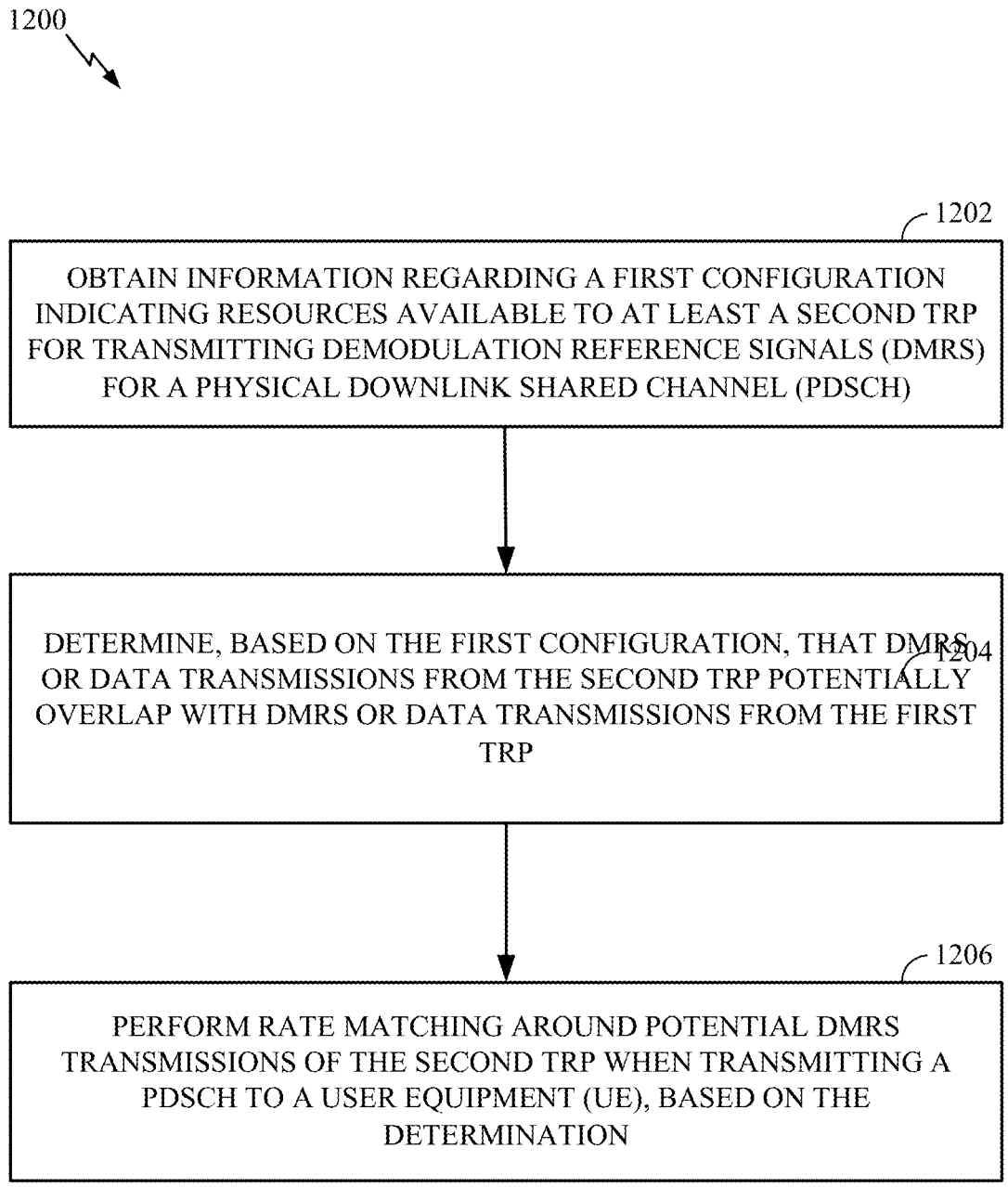
FIG. 12 illustrates example operations that may be performed by a network entity, in accordance with aspects of the present disclosure.

FIG. 12 illustrates example operations 1200 for wireless communications by a first TRP, in accordance with aspects of the present disclosure. For example, operations 1200 may be performed by a BS/gNB 110 shown in FIGS. 1 and 4 to configure a UE to perform rate matching according the operations of FIG. 11 described above.

Operations 1200 begin, at 1202, by obtaining information regarding a first configuration indicating resources available to at least a second TRP for transmitting demodulation reference signals (DMRS) for a physical downlink shared channel (PDSCH). At 1204, the first TRP determines, based on the first configuration, that DMRS or data transmissions from the second TRP potentially overlap with DMRS or data transmissions from the first TRP.

At 1206, the first TRP performs rate matching around potential DMRS transmission of the second TRP when transmitting a PDSCH to a user equipment (UE), based on the determination. In some cases, the grant the UE receives for the PDSCH transmission from each TRP may account for the rate matching (e.g., the TRPs may schedule the PDSCH transmissions accounting for the potential overlap in DMRS transmissions from the two TRPs.

As noted above, the techniques presented herein may allow a UE and multiple TRPs to coordinate rate matching for partial/full overlapping PDSCH transmissions in cases with little or no coordination across TRPs.

If the TRPs have relatively little (or no) coordination, the scheduled UE may be configured from each TRP with the various information regarding the DMRS configuration of each TRP according to one or more of the following alternatives.

In a first alternative, the UE may be configured with the port(s) indices/indexes which will be used for DMRS transmissions by each TRP. For example, Port {0,1} may be used for DMRS from TRP1, while port {2,3} may be used for DMRS from TRP2.

In a second alternative, the UE may be configured with the DMRS port group index (e.g., Group 0/1/2/3). In a third alternative, the UE may be configured with the CDM port group index (e.g., Group 0/1/2/3). In other words, the TRPs may always be transmitting within the corresponding subset of ports.

If the subset of DMRS ports for each TRP are from the same DMRS group, each port may have the same port parameters which may help each TRP with rate matching around potential DMRS transmissions from the other port.

If the TRPs do not coordinate at all, the UE may report to this information to each of the TRPs. For example, to assist in rate matching, a UE may signal one TRP which ports/CDM-group/DMRS-port-group are used by the other TRP.

Whether by UE reporting or backhaul communication, each TRP may get signaling of the DMRS ports/DMRS groups/CDM groups which are used by the other TRPs.

In some cases, each TRP may then be able to rate match their respective PDSCH assuming that the assigning DMRS ports of the remaining TRPs are always transmitting DMRS (e.g., a worst case assumption), even if eventually no PDSCH collision may exist. A UE may take similar action, to perform rate matching when processing PDSCH transmissions from the multiple TRPs.

Figure 13:
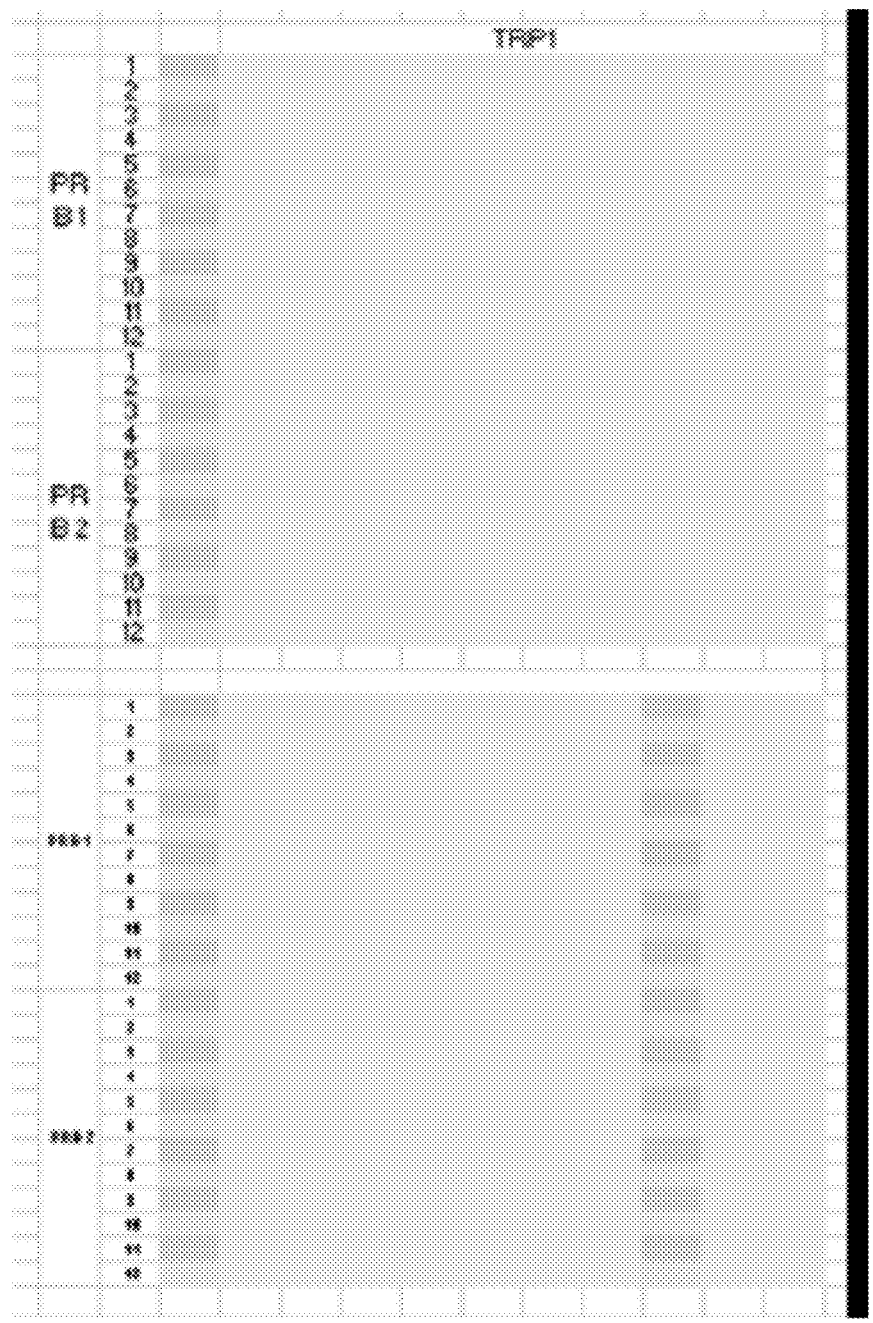
FIG. 13 illustrates examples of demodulation reference signal (DMRS) configurations, in accordance with aspects of the present disclosure.

In some cases, an indication may exist to swap between various modes. In a first mode, the TRPs be assumed to always be non overlapping in frequency/time, such as illustrated in FIG. 13 where each TRP is assigned a different PRB. In this case, orthogonal resources are transmitted, and therefore the gNBs do not need to stick in transmitting in a specific subset of DMRS ports. In this case, signaling of subset of DMRS ports/CDM port groups/DMRS port group may not be needed. This mode may be the default mode of operation for new UEs and for legacy gNB/UE PDSCH rate matching.

In a second mode, the TRPs can potentially partially overlap in frequency/time. If the UE is signaled this mode, the techniques described above may be applied. In other words, gNBs/TRPs and UEs may assume that the PDSCH is rate matched in all the PRBs for which a DMRS collision may potentially occur, independent of whether actually a collision occurred (as noted above, this may be considered a worst-case assumption).

In a third mode, the TRPs may only (fully) overlap in frequency/time. There are various options for this mode. For example, in a first option, a same solution as the case that the TRPs can potentially fully overlap.

In a second option, collision of DMRS ports/CDM port groups/DMRS port group may occur across different TRPs under the following constraints (one, or combination may apply) and various options may be applied.

For example, according to a first option, different TRPs may transmit DMRS with different sequences. For example, the different sequences may be generated using different scrambling IDs of colliding DMRS port/CDM group/DMRS port group is used from each of the colliding TRPs.

According to a third option, the UE reports the maximum number of orthogonal ports+non-orthogonal serving ports which can be transmitted. For example, assume one TRP uses port 0, and the other TRP uses port 0,2 with a different scrambling ID/scrambling sequence for port 0. This results to effectively 3 ports transmitted to the UE (1 from TRP1, and 2 from TRP2). Then the UE would need to report that it can support this mode of operation: 1 port from one TRP, with another port transmitted from another TRP which is non-orthogonal to the port transmitted from another TRP.

It is also possible to configure a set of slots/mini-slots for the potential multi-TRP transmission where the schemes mentioned above apply while some other set of slots/mini-slots for the single TRP transmission from TRP 1 and some other set of slots/mini-slots for the single TRP transmission from TRP2. For those set of slots/mini-slots with pre-configured single TRP transmission, the transmission TRP only needs to rate match around its own DMRS ports without the necessity to rate match around the DMRS ports used by the other TRP,

EXAMPLE EMBODIMENTS

Embodiment 1: A method of wireless communications by a first transmission reception point (TRP), comprising obtaining information regarding a first configuration indicating resources available to at least a second TRP for transmitting demodulation reference signals (DMRS) for a physical downlink shared channel (PDSCH), determining, based on the first configuration, that DMRS or data transmissions from the second TRP potentially overlap with DMRS or data transmissions from the first TRP and performing rate matching around potential DMRS transmissions of the second TRP when transmitting a PDSCH to a user equipment (UE), based on the determination.

Embodiment 2: The method of Embodiment 1, wherein the rate matching is performed assuming the second TRP transmits on DMRS ports assigned according to the first configuration and the UE transmits downlink control information (DCI) scheduling the PDSCH, in accordance with the rate matching.

Embodiment 3: The method of any of Embodiments 1-2, wherein the information regarding the first configuration is obtained from at least one of the UE or the second TRP.

Embodiment 4: The method of any of Embodiments 1-3, wherein the information comprises at least one of: one or more DMRS port indexes, a DMRS port group index, or a code division multiplexing (CDM) group index.

Embodiment 5: The method of any of Embodiments 1-4, wherein DMRS ports assigned to each TRP are from a same DMRS port group.

Embodiment 6: The method of any of Embodiments 1-5, further comprising receiving signaling indicating whether the first and second TRPs transmit DMRS or data on non-overlapping resources, potentially partially overlapping resources, or potentially fully overlapping resources and performing the rate matching based on the determination only if the signaling indicates the first and second TRPs transmit DMRS on potentially partially or fully overlapping resources or performing the rate matching based on its own DMRS transmission only if the signaling indicates the first and second TRPs transmit DMRS or data on non-overlapping resources.

Embodiment 7: The method of any of Embodiments 1-6, further comprising, for the case that the first and second TRPs transmit DMRS on potentially overlapping resources transmitting DMRS subject to one or more constraints.

Embodiment 8: The method of Embodiment 7, wherein the one or more constraints comprise the first and second TRPs using different sequences for transmitting DMRS than the second TRP.

Embodiment 9: The method of Embodiment 8, wherein the different sequence are generated by applying different scrambling sequences.

Embodiment 10: The method of any of Embodiments 1-9, wherein the one or more constraints are based on a maximum number of orthogonal ports and non-orthogonal serving ports which can be transmitted, as reported by the UE.

Embodiment 11: A method of wireless communications by a user equipment (UE), comprising obtaining information regarding a first configuration indicating resources available to at least a first transmission reception point (TRP) for transmitting demodulation reference signals (DMRS) for a physical downlink shared channel (PDSCH), obtaining information regarding a second configuration indicating resources available to at least a second TRP for transmitting DMRS for a PDSCH determining, based on the first configuration, that DMRS or data transmissions from the second TRP potentially overlap with DMRS or data transmissions from the first TRP, and performing rate matching when processing PDSCH transmissions with potential overlap of DMRS transmissions from the first and second TRPs based on the determination.

Embodiment 12: The method of Embodiment 11, wherein the rate matching is performed assuming the second TRP transmits on DMRS ports assigned according to the first configuration.

Embodiment 13: The method of any of Embodiments 11-12, further comprising providing information regarding the first configuration to the second TRP and providing information regarding the second configuration to the first TRP.

Embodiment 14: The method of any of Embodiments 11-13, wherein the information regarding the first configuration is obtained from the first TRP and the information regarding the second configuration is obtained from the second TRP.

Embodiment 15: The method of any of Embodiments 11-14, wherein the information comprises at least one of: one or more DMRS port indexes, a DMRS port group index, or a code division multiplexing (CDM) group index.

Embodiment 16: The method of any of Embodiments 11-15, further comprising receiving signaling indicating whether the first and second TRPs transmit DMRS or data on non-overlapping resources, potentially partially overlapping resources, or potentially fully overlapping resources and performing the rate matching based on the determination only if the signaling indicates the first and second TRPs transmit DMRS on potentially partially or fully overlapping resources.

Embodiment 17: The method of any of Embodiments 11-16, further comprising, for the case that the first and second TRPs transmit DMRS on potentially overlapping resources DMRS is transmitted subject to one or more constraints.

Embodiment 18: The method of Embodiment 17, wherein the one or more constraints comprise the first and second TRPs using different sequences for DMRS transmissions.

Embodiment 19: The method of Embodiment 18, wherein the first and second TRPs use different scrambling IDs to generate the different DMRS sequences.

Embodiment 20: The method of any of Embodiments 11-19, wherein the one or more constraints are based on a maximum number of orthogonal ports and non-orthogonal serving ports which can be transmitted, as reported by the UE.

Embodiment 21: An apparatus for wireless communications by a first transmission reception point (TRP), comprising means for obtaining information regarding a first configuration indicating resources available to at least a second TRP for transmitting demodulation reference signals (DMRS) for a physical downlink shared channel (PDSCH), means for determining, based on the first configuration, that DMRS or data transmissions from the second TRP potentially overlap with DMRS or data transmissions from the first TRP, and means for performing rate matching around potential DMRS transmissions of the second TRP when transmitting a PDSCH to a user equipment (UE), based on the determination.

Embodiment 22: The apparatus of Embodiment 21, wherein the information comprises at least one of: one or more DMRS port indexes, a DMRS port group index, or a code division multiplexing (CDM) group index.

Embodiment 23: The apparatus of any of Embodiments 21-22, wherein DMRS ports assigned to each TRP are from a same DMRS port group.

Embodiment 24: The apparatus of any of Embodiments 21-23, further comprising, for the case that the first and second TRPs transmit DMRS on potentially overlapping resources means for transmitting DMRS subject to one or more constraints.

Embodiment 25: The apparatus of Embodiment 24, wherein the one or more constraints comprise the first and second TRPs using different sequences for transmitting DMRS than the second TRP.

Embodiment 26: The apparatus of Embodiment 25, wherein the different sequences are generated by applying different scrambling sequences.

Embodiment 27: An apparatus of wireless communications by a user equipment (UE), comprising means for obtaining information regarding a first configuration indicating resources available to at least a first transmission reception point (TRP) for transmitting demodulation reference signals (DMRS) for a physical downlink shared channel (PDSCH), means for obtaining information regarding a second configuration indicating resources available to at least a second TRP for transmitting DMRS for a PDSCH, means for determining, based on the first configuration, that DMRS or data transmissions from the second TRP potentially overlap with DMRS or data transmissions from the first TRP, and means for performing rate matching when processing PDSCH transmissions with potential overlap of DMRS transmissions from the first and second TRPs based on the determination.

Embodiment 28: The apparatus of Embodiment 27, wherein the rate matching is performed assuming the second TRP transmits on DMRS ports assigned according to the first configuration.

Embodiment 29: The apparatus of any of Embodiments 27-28, wherein the information comprises at least one of: one or more DMRS port indexes, a DMRS port group index, or a code division multiplexing (CDM) group index.

Embodiment 30: The apparatus of any of Embodiments 27-29, wherein the first and second TRPs use different sequences for DMRS transmissions.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 11 and 12 may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11 and/or 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration nd components illustrated above. Various modifications, changes and variations may be made in the arrangement, operation and details of the methods and apparatus described above without departing from the scope of the claims.

What is claimed is:

1. A method of wireless communications by a first transmission reception point (TRP), comprising:
   obtaining information regarding a first configuration indicating resources available to at least a second TRP for transmitting demodulation reference signals (DMRS) for a physical downlink shared channel (PDSCH);
   receiving signaling indicating whether the first and second TRPs transmit DMRS or data on non-overlapping resources, partially overlapping resources, or fully overlapping resources;
   determining, based on the first configuration, that DMRS or data transmissions from the second TRP potentially overlap with DMRS or data transmissions from the first TRP; and
   performing rate matching around potential DMRS transmissions of the second TRP when transmitting a PDSCH to a user equipment (UE), based on the determination, only if the signaling indicates that the first TRP and the second TRP transmit the DMRS on the partially or fully overlapping resources.

2. The method of claim 1, wherein:
   the rate matching is performed assuming the second TRP transmits on DMRS ports assigned according to the first configuration; and
   the UE transmits downlink control information (DCI) scheduling the PDSCH, in accordance with the rate matching.

3. The method of claim 1, wherein the information regarding the first configuration is obtained from at least one of the UE or the second TRP.

4. The method of claim 1, wherein the information comprises at least one of: one or more DMRS port indexes, a DMRS port group index, or a code division multiplexing (CDM) group index.

5. The method of claim 1, wherein DMRS ports assigned to each TRP are from a same DMRS port group.

6. The method of claim 1, further comprising, for a case that the first and second TRPs transmit DMRS on potentially overlapping resources:
   transmitting DMRS subject to one or more constraints.

7. The method of claim 6, wherein the one or more constraints comprise:
   the first TRP using different sequences for transmitting DMRS than the second TRP, wherein the different sequences are generated by applying different scrambling sequences.

8. The method of claim 1, further comprising performing the rate matching based on its own DMRS transmission only if the signaling indicates the first and second TRPs transmit the DMRS or the data on the non-overlapping resources.

9. The method of claim 6, wherein the one or more constraints are based on a maximum number of orthogonal ports and non-orthogonal serving ports which can be transmitted, as reported by the UE.

10. A method of wireless communications by a user equipment (UE), comprising:
    obtaining information regarding a first configuration indicating resources available to at least a first transmission reception point (TRP) for transmitting demodulation reference signals (DMRS) for a physical downlink shared channel (PDSCH);
    obtaining information regarding a second configuration indicating resources available to at least a second TRP for transmitting DMRS for a PDSCH;
    receiving signaling indicating whether the first and second TRPs transmit DMRS or data on non-overlapping resources, partially overlapping resources, or fully overlapping resources;
    determining, based on the first configuration, that DMRS or data transmissions from the second TRP potentially overlap with DMRS or data transmissions from the first TRP; and
    performing rate matching when processing PDSCH transmissions with potential overlap of DMRS transmissions from the first and second TRPs, based on the determination, only if the signaling indicates that the first TRP and the second TRP transmits the DMRS on the partially or fully overlapping resources.

11. The method of claim 10, wherein the rate matching is performed assuming the second TRP transmits on DMRS ports assigned according to the first configuration.

12. The method of claim 10, further comprising:
    providing information regarding the first configuration to the second TRP; and
    providing information regarding the second configuration to the first TRP.

13. The method of claim 10, wherein:
    the information regarding the first configuration is obtained from the first TRP; and
    the information regarding the second configuration is obtained from the second TRP.

14. The method of claim 10, wherein the information comprises at least one of: one or more DMRS port indexes, a DMRS port group index, or a code division multiplexing (CDM) group index.

15. The method of claim 10, further comprising, for a case that the first and second TRPs transmit DMRS on potentially overlapping resources:
DMRS is transmitted subject to one or more constraints.

16. The method of claim 15, wherein the one or more constraints comprise:
the first and second TRPs using different sequences for DMRS transmissions.

17. The method of claim 16, wherein the first and second TRPs use different scrambling IDs to generate the different DMRS sequences.

18. The method of claim 15, wherein the one or more constraints are based on a maximum number of orthogonal ports and non-orthogonal serving ports which can be transmitted, as reported by the UE.

19. An apparatus for wireless communications by a first transmission reception point (TRP), comprising:
means for obtaining information regarding a first configuration indicating resources available to at least a second TRP for transmitting demodulation reference signals (DMRS) for a physical downlink shared channel (PDSCH);
means for receiving signaling indicating whether the first and second TRPs transmit DMRS or data on non-overlapping resources, partially overlapping resources, or fully overlapping resources;
means for determining, based on the first configuration, that DMRS or data transmissions from the second TRP potentially overlap with DMRS or data transmissions from the first TRP; and
means for performing rate matching around potential DMRS transmissions of the second TRP when transmitting a PDSCH to a user equipment (UE), based on the determination, only if the signaling indicates that the first TRP and the second TRP transmits the DMRS on the partially or fully overlapping resources.

20. The apparatus of claim 19, wherein the information comprises at least one of:
one or more DMRS port indexes, a DMRS port group index, or a code division multiplexing (CDM) group index.

21. The apparatus of claim 19, wherein DMRS ports assigned to each TRP are from a same DMRS port group.

22. The apparatus of claim 19, further comprising, for a case that the first and second TRPs transmit DMRS on potentially overlapping resources:
means for transmitting DMRS subject to one or more constraints.

23. The apparatus of claim 22, wherein the one or more constraints comprise:
the first TRP using different sequences for transmitting DMRS than the second TRP.

24. The apparatus of claim 23, wherein the different sequences are generated by applying different scrambling sequences.

25. An apparatus of wireless communications by a user equipment (UE), comprising:
means for obtaining information regarding a first configuration indicating resources available to at least a first transmission reception point (TRP) for transmitting demodulation reference signals (DMRS) for a physical downlink shared channel (PDSCH);
means for obtaining information regarding a second configuration indicating resources available to at least a second TRP for transmitting DMRS for a PDSCH;
means for receiving signaling indicating whether the first and second TRPs transmit DMRS or data on non-overlapping resources, partially overlapping resources, or fully overlapping resources;
means for determining, based on the first configuration, that DMRS or data transmissions from the second TRP potentially overlap with DMRS or data transmissions from the first TRP; and
means for performing rate matching when processing PDSCH transmissions with potential overlap of DMRS transmissions from the first and second TRPs, based on the determination, only if the signaling indicates that the first TRP and the second TRP transmits the DMRS on the partially or fully overlapping resources.

26. The apparatus of claim 25, wherein the rate matching is performed assuming the second TRP transmits on DMRS ports assigned according to the first configuration.

27. The apparatus of claim 25, wherein the information comprises at least one of:
one or more DMRS port indexes, a DMRS port group index, or a code division multiplexing (CDM) group index.

28. The apparatus of claim 25, wherein the first and second TRPs use different sequences for DMRS transmissions.

* * * * *